United States Patent [19]
Vetter et al.

[11] 3,846,570
[45] Nov. 5, 1974

[54] PREPARATION OF FRUIT COMPOSITIONS

[75] Inventors: Walter Vetter, Meggen; Hanspeter Mueller, Emmenbruecke; Theodor Geissman, Reinach, all of Switzerland

[73] Assignee: International Flavors & Fragrances, Inc., New York, N.Y.

[22] Filed: Mar. 26, 1973

[21] Appl. No.: 345,002

[52] U.S. Cl............ 426/399, 426/524, 426/521, 426/407, 426/519, 426/378
[51] Int. Cl............................................ A23c 3/00
[58] Field of Search .......... 426/222, 221, 250, 321, 426/328, 335, 342, 350, 377, 378, 520, 521, 524, 519, 399–401; 99/452, 348, 420, 483; 62/62, 63, 65; 165/65

[56] References Cited
UNITED STATES PATENTS

| | | | |
|---|---|---|---|
| 684,319 | 10/1901 | Short | 165/65 |
| 1,693,034 | 11/1928 | Jensen | 426/521 |
| 1,696,399 | 1/1925 | Hanson | 426/377 |
| 2,726,958 | 12/1955 | Fisher | 426/378 |
| 3,019,113 | 1/1962 | Rooker | 426/399 |
| 3,103,438 | 9/1963 | Rowse | 426/328 |
| 3,232,770 | 2/1966 | Schack | 426/401 |

OTHER PUBLICATIONS

Bailey's Industrial Oils & Fats, Third Edition, Swern, 1964, New York, 1066–1067.

*Primary Examiner*—Norman Yudkoff
*Assistant Examiner*—Ernest G. Therkorn

[57] ABSTRACT

Natural fruit compositions for addition to food products such as milk-based foods are prepared by a process which destroys micro-organisms in the fruits without depriving the fruit of its texture, taste, color, and other characteristics. The process economically employs closed systems of continuously operating apparatus.

11 Claims, 9 Drawing Figures

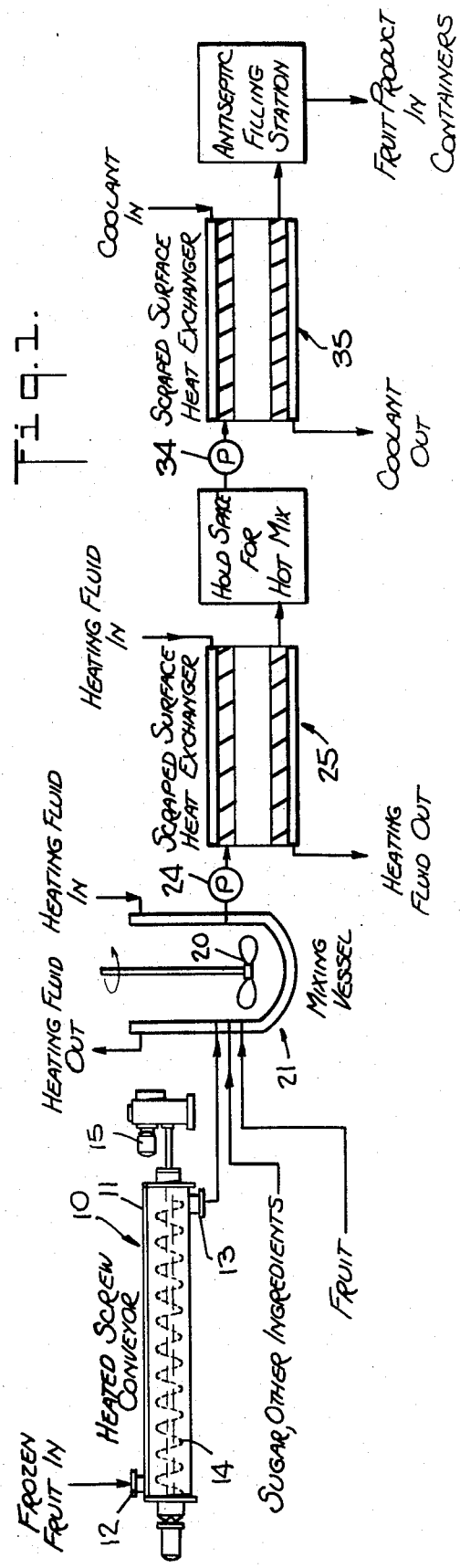
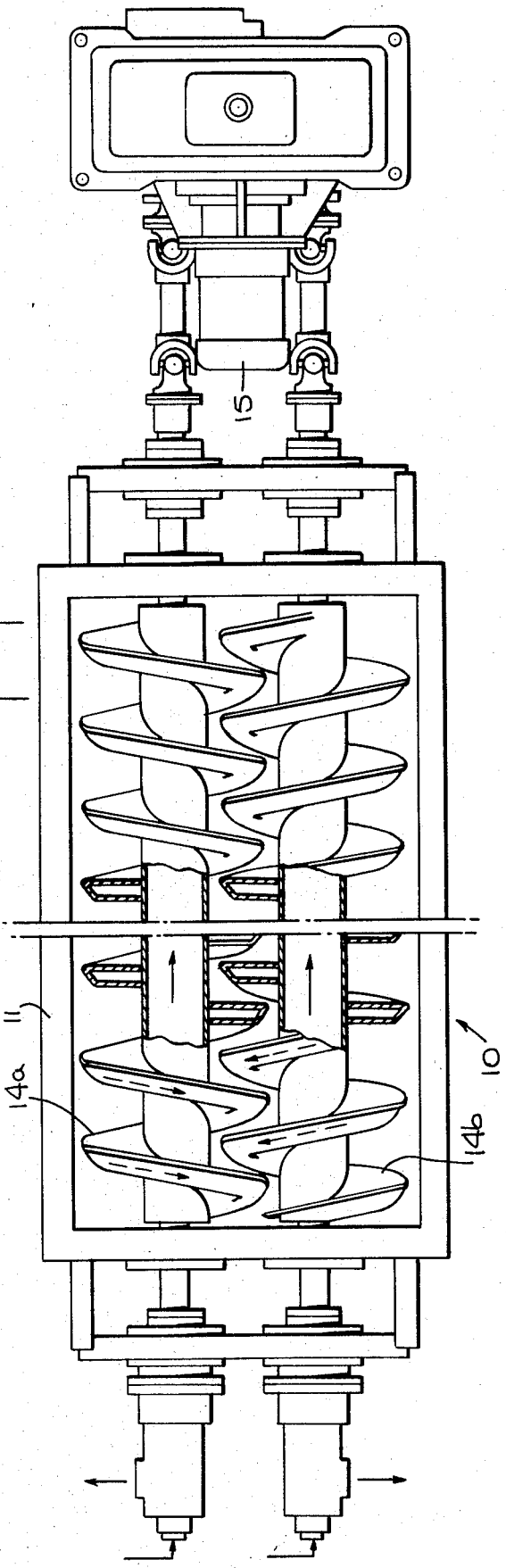

ABSORBANCE SPECTRUM OF RED BEET
COLOR, 0.125 GR. PERCENT AT pH 3.5

Degradation Of Red Beet Color
f(Temp./Time)

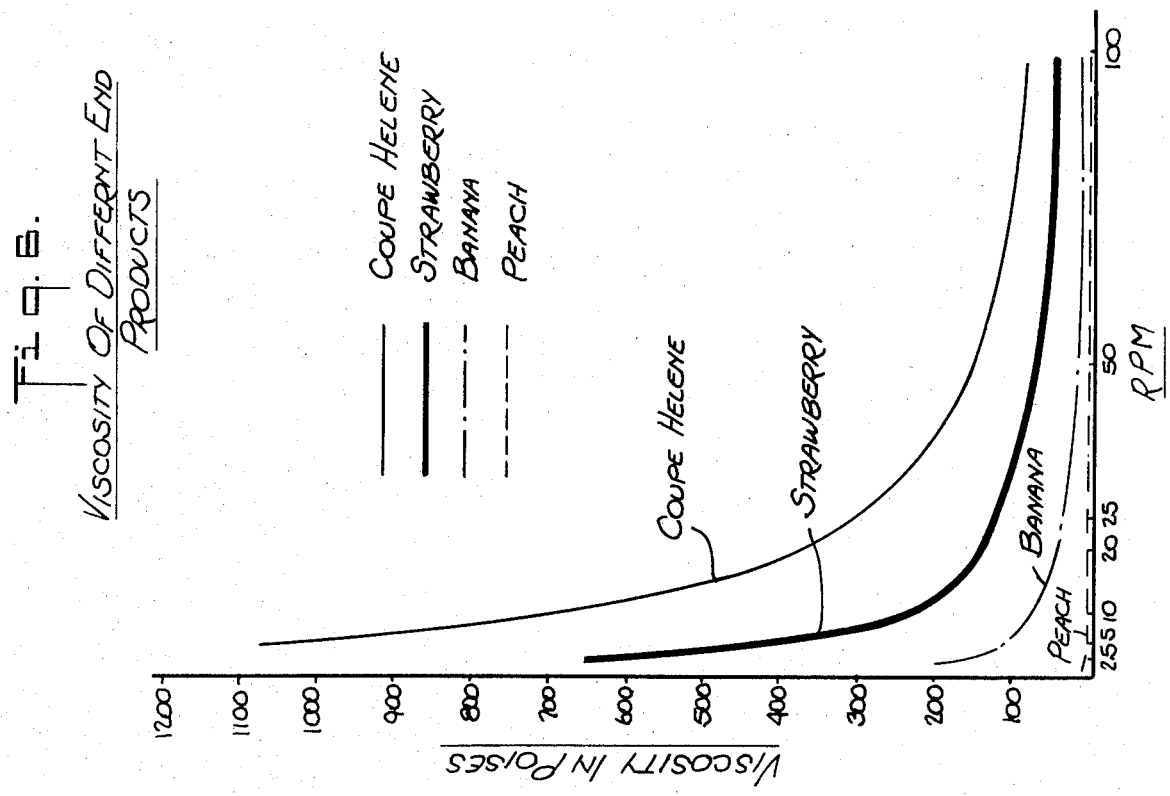
Fig. 6. Viscosity Of Different End Products
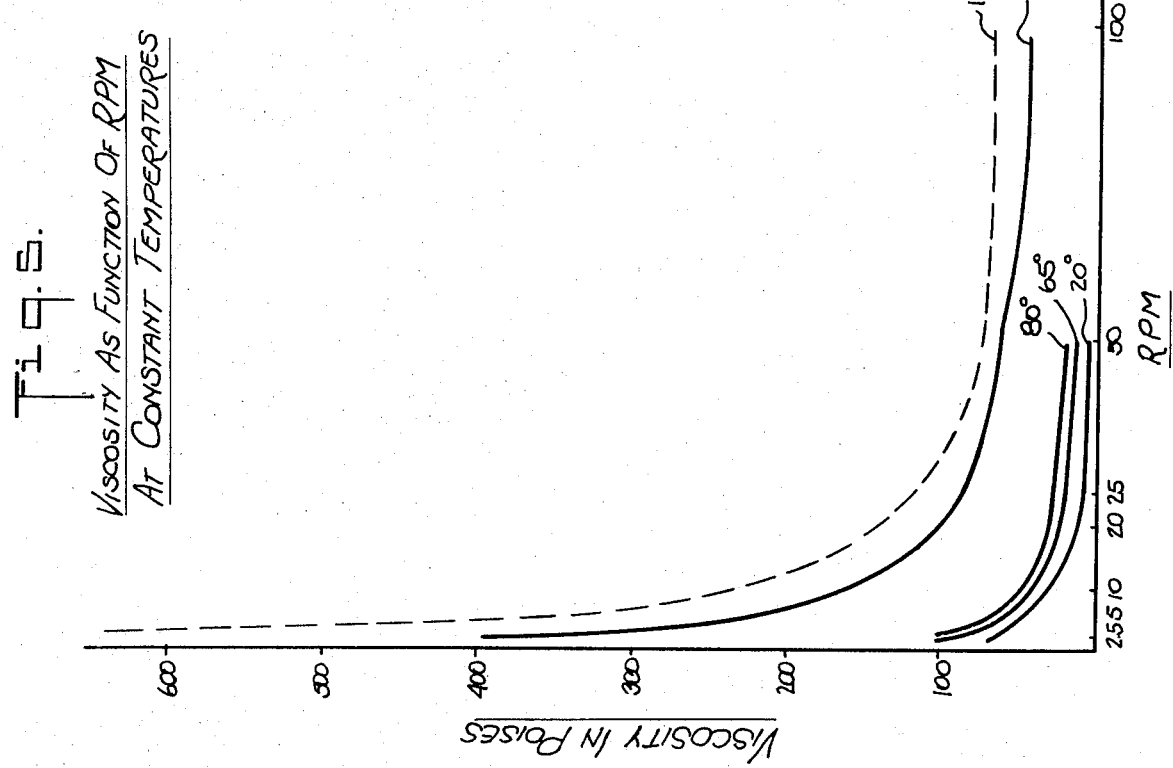
Fig. 5. Viscosity As Function Of RPM At Constant Temperatures

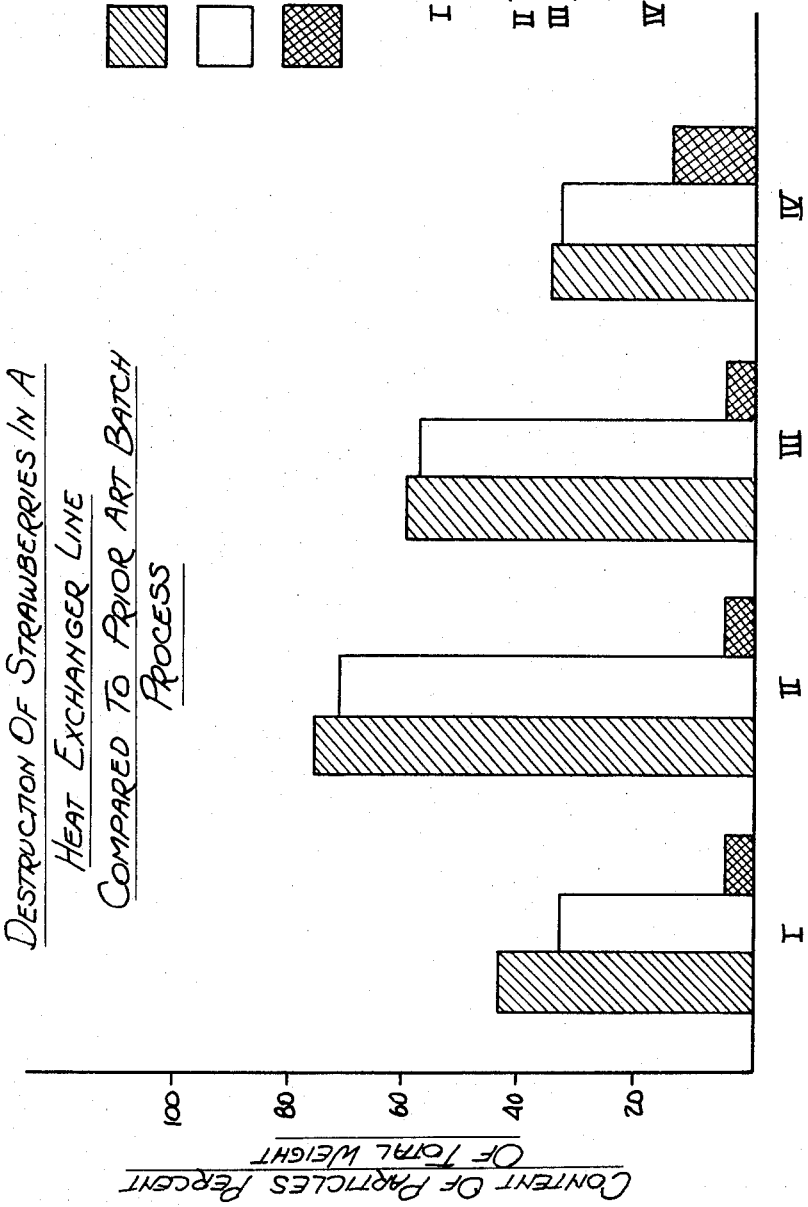

PREPARATION OF FRUIT COMPOSITIONS

BACKGROUND OF THE INVENTION

1. Field of the Invention

The present invention relates to the production of natural fruit compositions; and, more particularly, to a process and apparatus for production of fruit compositions suitable for addition to milk products.

2. Description of the Prior Art

Fresh fruits are commonly added in the home to such milk products as yogurt, jellified milk, curdled milk, cottage cheese, ice cream, dessert foods and the like. Since micro-organisms such as yeasts, molds, and bacteria are always present to some degree in natural fruits, home-made preparations of milk products with fruits have to be consumed immediately to avoid spoilage, and even refrigeration does not prevent spoilage for very long.

The preparation of dairy products with fruit added for commercial marketing requires that the prepared products must have a shelf life of 8 to 21 days or longer. In order to satisfy the demand for such commercially prepared and packaged products, stable fruit compositions free of viable micro-organisms were needed. Fruit syrups and jams have been used in the past as additions to dairy products for commercial marketing, but these were generally unsatisfactory for failure to retain the taste, texture or other qualities of the natural fruit when added to milk products. Substitutions of large amounts of additives instead of natural fruits to simulate the fruit qualities is not an attractive solution. It is much more desirable to utilize the qualities of the natural fruit itself to the greatest degree possible by providing fruit compositions with a large percentage of fruit particles that retain true fruit characteristics.

The preparation of purees and sauces has been discussed in U.S. pat. Nos. 3,031,307 to Blakemore; 3,103,438 to Rowse; and 3,142,577 to Anderson et al., but the methods and apparatus shown and described in those prior art patents would not serve to produce natural fruit compositions that would retain the characteristics of the natural fruit if added to milk products. All of the above-mentioned prior art patents relate to processes in which it was not necessary to preserve the structure of the fruits or vegetables processed, and relatively large size particles were to be avoided rather than retained.

Blakemore, 3,031,307 relates to producing fruit and vegetable purees by a process including chopping, stirring and straining and optional batch processing if there is a danger of fermentation. The purees desired by Blakemore are smooth and free of undisintegrated fruit.

Rowse, 3,013,438 concerns the production of sauces and purees from both fruits and vegetables, and more particularly to the making of apple sauce. The process uses screening centrifuges to separate edible from inedible material and the fruit is subjected to several mechanical operations that disintegrate the fruit.

Anderson, et al., 3,142,577 relates to the production of jellied cranberry sauce and contemplates disintegration of berries to avoid discrete particles in the product.

For use with milk products, fruit compositions must be treated to kill micro-organisms. The above-noted patents refer to heat treatment for sterilization and a more complete discussion of sterilization techniques has been presented by Pflug and Esselen in "Food Processing by Heat Sterilization," chapter 36 of *Food Processing Operations*, ed. Heid and Joslyn, 1963. The latter publication refers to heat exchangers at pages 465–470.

Despite the availability of various kinds of heat exchangers which might be used in sterilizing fruits, such equipment has not previously been entirely successful when it has been desired to retain the characteristic texture and structure, taste and color of fruit processed. Conventional heat exchanger food processing has not been adapted to the special requirements of fruit compositions for addition to milk products.

To retain the characteristics of fruit and also to make the fruit suitable for addition to milk products, the best prior art techniques have involved careful batch processing in two or more steps, in an attempt to avoid disintegration of the fruit and the loss of natural fruit qualities. However, the pasteurization of fruit and other ingredients in batches in kettles requires very vigorous stirring to obtain adequate heat transfer to pasteurize the material thoroughly. Such vigorous stirring causes disintegration of fruit particles, but such particles are desirable in the product if the natural fruit character is to be retained. Fruit color is difficult to retain through batch processes.

Because of the difficulties involved, the prior art has failed to provide an economical, high volume process for producing fruit compositions of highest quality most suitable for addition to milk products.

SUMMARY OF THE INVENTION

Commercially produced fruit compositions intended for inclusion in commercially produced and packaged food products should retain the character of natural fruit, but the fruit compositions must also be free of viable microorganisms which would cause spoilage of the product. These requirements are particularly strict for fruit compositions to be added to milk products. The process and apparatus of this invention fulfills both requirements of quality and sterility in an economical manner by providing a new and unobvious solution to the problems of commercial production of fruit compositions for addition to food products, particularly milk products.

The term "fruit composition" as used throughout the specification and claims of this application means mixtures of natural fruits with one or more other ingredients. It is believed that all well-known fruits and berries can be processed for use in fruit compositions in accordance with the method and by use of the apparatus of the invention. Vegetables other than those normally designated fruits can also be advantageously processed in accordance with the invention if desired.

The term "milk products" as used throughout this specification includes foods such as yogurt, jellified milk, curds or curdled milk such as "quark," cottage cheese, ice cream, dessert foods based on milk, and other dairy products to which fruit may be added.

The fruit to be processed can initially be in fresh, deep-frozen, dried or canned form, and can be either whole, sliced, diced or mashed. Any necessary cleaning steps must be done before further processing in accordance with the invention, since, as will appear in the further description, the process is substantially self-contained and closed to avoid infection by micro-organisms.

Besides the fruit itself, the fruit compositions according to the invention will ordinarily include one or more additional ingredients, or "fruit adjuvants," such as sugar, thickening agents, flavoring substances, coloring substances and preservatives. The fruit adjuvants are mixed with the fruit in a manner to be explained hereinafter to form a substantially homogeneous mixture that retains the characteristics of natural fruit.

Fruit compositions produced according to the invention will ordinarily include sugar, except when the compositions are intended for use in dietetic products. The aforementioned homogeneous mixture with the fruit and with or without other ingredients can thus contain up to 65% sugar by weight.

Unless a specific statement is made to the contrary, all percentages, ratios and proportions stated in this specification are based on weight.

In the case of some fruit compositions made according to the invention, especially when the natural consistency of the fruit is insufficient to keep pieces of the fruit or pulp suspended in even distribution in the composition, or to avoid the separation of juice from the composition, thickening agents can be added to the fruit. Preferably the thickening agent is a natural polysaccharide such as a starch, pectin, carrageenin, alginate or gum or a combination of such natural substances. Normally the thickening agent will constitute from 0 to about 2 percent of the weight of the mixture including fruit and with or without other ingredients.

A flavoring substance or a combination of flavoring substances may also be added to the fruit during processing. Normally such an addition will be made to replace flavor lost during processing, or to standardize, broaden or improve the taste of the fruit composition. Suitable flavoring substances include organic acids, natural flavor concentrates and extracts, synthetic nature identical compounds or such artificial flavor compounds as may be permissible by law. Ordinarily up to about 5 percent by weight of flavoring substances can be present in the mixture of the fruit with or without other ingredients.

Coloring substances can also be used as ingredients of fruit compositions produced according to the invention. Milk products are usually white and the colors of fruit compositions added to milk products can make the products more attractive. This is especially true for such fruit additions as strawberries, raspberries, and other brightly colored berries. However, the natural color constituents of berries and the like are delicate and some color may be destroyed during pasteurization. To enhance the color of the fruit composition, or to compensate for color loss due to heating, such natural coloring substances as color concentrates from black currents, red beet root, bilberries, elderberry or oenocyanin from grapes or others may be added. Where permitted by law, artificial coloring substances can be added. The mixture of fruit can include up to about 5 percent by weight of coloring substances with or without other ingredients.

In some cases, chemical preservatives can be added, if permitted by law. The fruit compositions of the invention can be made with or without chemical preservatives. Suitable chemical preservatives include formic, sulphurous, benzoic and sorbic acids and their derivatives such as hydroxyesters or their potassium or sodium salts, or mixtures thereof. The chemical preservatives added can constitute up to about 1 percent by weight of the mixture of fruit with or without other ingredients.

In some cases, such as when canned fruits are to be processed, the process according to the invention can begin by mixing the fruits with other ingredients in the manner to be described subsequently, but preliminary steps are necessary in other cases. It has been mentioned that fruits must be cleaned, and undesired portions of fruits to be processed must be removed before mixing and processing of the fruit according to the invention, to avoid the introduction of micro-organisms. It is also necessary to take steps preliminary to mixing when frozen fruits are to be processed.

Frozen fruits must be thawed before they can be mixed with other ingredients. Thawing could be accomplished by conventional means, but for economy and high volume production of fruit compositions, it has been found advantageous to utilize a heated screw conveyor to thaw frozen fruit and raise the temperature of the fruit from its initial temperature of from about −25° to −10°C to a final temperature of about +15° to +20°C. It has been found that by the use of a double screw conveyor having heated hollow screws, one such conveyor can thaw and warm up about 2,000 kg of fruit per hour in continuous operation. Alternatively, frozen fruit could be thawed in large volumes by the use of microwaves or high frequency vibrations.

After the fruit has been prepared by cleaning, by shaping operations such as cutting or dicing, or thawing if necessary, the fruit is mixed with other ingredients. This mixing can preferably be performed in large vessels or kettles which are adapted to heat the ingredients during mixing. A homogeneous mixture should be produced and the temperature of the mixture should be increased during mixing to about 40°C. If sugar is added, it can be added pneumatically to the fruit in prefixed amounts, and a mixing period of about 20–30 minutes is required to dissolve the sugar. Ingredients such as thickening agents should be added until the mixture has reached a temperature of about 30° to 40°C.

After the fruit and other ingredients have been mixed to produce a substantially homogeneous mixture, the mixture is rapidly heated and then cooled. Heating is necessary to pasteurize the mixture, but the mixture should not be subjected to long periods of high temperature treatment or undesirable color loss and formation of objectionable burnt notes and overcooked nuances will occur. It is also important that fruit particles ranging in diameter from 1–2 cm not be damaged, since such relatively large particles are of particular importance in retaining the characteristic texture and other qualities of the natural fruit in the fruit composition.

Thermal pasteurization has been found to be the only feasible process for destruction of micro-organisms in fruit to produce fruit compositions that retain the qualities of natural fruit for addition to such foods as milk products. Such methods of pasteurization as gassing, irradiation, ultrafiltration and the use of ultrasonics are not presently believed practicable or are much too expensive.

Even when thermal pasteurization is employed, the stringent conditions that must be satisfied to produce the fruit compositions according to the invention rule out the use of conventional pasteurization techniques and apparatus. Ordinary tube heat exchangers and heating apparatus that operate at high viscosities are unsuitable. The deficiencies of batch processing techniques and apparatus have already been noted.

It is necessary to bring fruit mixtures rapidly to a pasteurization temperature of about 80° to 90°C to avoid degradation of the fruit. Suitably, pasteurization should be accomplished in less than 10 minutes. The fruit mixture is brought to its pasteurization temperature, held at that elevated temperature, and then rapidly cooled. It has been found that the fruit mixture should be kept at an elevated temperature of about 80° to 90°C for a period of 3 minutes or more to obtain adequate pasteurization. To avoid degradation resulting from heating, the preferred total period of heating to the elevated pasteurization temperature plus the hold time at that elevated temperature is about 4 to 8 minutes.

It has surprisingly been found that so-called scraped surface heat exchangers can be adapted for very rapid continuous heating of large quantities of fruit mixtures to about 80° to 90°C, without destruction of color, fruit structure and other qualities desired in fruit compositions suitable for addition to milk products.

By the use of scraped surface heat exchangers, according to the invention, the total period for heating to and holding at the elevated pasteurization temperature of 80° to 90°C can readily be brought within the range of 4 to 8 minutes.

In a scraped surface heat exchanger the material treated passes through a narrow elongated annular passage between a heated cylindrical shell and a central rotor. Scrapers or blades rotate with the rotor to remove any material tending to adhere to the inside of the cylindrical shell and also gently agitate the mixture flowing through the passage. The effect of the scraper blades on the mixture can be described as a folding action, since the blades gently turn over the mixture, assuring optimum heat transfer throughout the flowing mixture for uniform, rapid heating.

The rate of rotation of the rotor, and accordingly of the blades of the scraped surface heat exchanger, depends upon the heat exchange surface area of the heat exchanger, but cannot be so fast as to cause disintegration of the fruit particles in the mixture. Blade rotation speeds of about 300 R.P.M. result in satisfactory retention of fruit particles. It is accordingly preferable to use a heat exchanger having a sufficiently large heat exchange surface so that blade rotation speeds in excess of about 400 R.P.M. are not required.

The mixture must be gently passed through the heat exchanger, and it has been found that a capsule pump can be used for gently pumping the mixture through a scraped surface heat exchanger.

A second scraped surface heat exchanger can be advantageously used for rapidly cooling the mixture to about 20°C after pasteurization. To avoid degradation of fruit qualities such as color loss, burnt notes and overcooked nuances, through long exposure to high temperatures, rapid cooling is necessary. This cooling should be accomplished in about 2 to 5 minutes, and such cooling can best be achieved by passing the mixture through a scraped surface heat exchanger.

The structure and operation of scraped surface heat exchangers adapted for use according to the invention will be more fully described hereinafter.

After cooling, the fruit mixture is filled into containers. It should be noted that to avoid reinfection, the heat exchange operations of pasteurizing and cooling, and the filling procedures should be performed in a closed system. Aseptic filling can be done by feeding the composition directly from the cooling process in a closed line to presterilized containers.

It will be clear to those acquainted with the art of food processing that the method and apparatus of the invention present a new and unobvious solution to the numerous problems of preparing fruit compositions suitable for addition to milk products. Other objects and advantages of the invention will more fully appear in the following detailed description of the preferred embodiments of the method and apparatus of the invention, and from the illustrative examples, when taken in conjunction with the accompanying drawing.

BRIEF DESCRIPTION OF THE DRAWING

FIG. 1 is a schematic illustration of a complete processing system of apparatus according to the invention.

FIG. 2 is a view from above, in section, of a heated screw conveyor for thawing fruits in accordance with the invention.

FIG. 5 is a graph showing the results of experimental measurements of the relationship between viscosity and agitation in revolutions per minute, using a Brookfield viscosimeter, of a strawberry composition at constant temperatures.

FIG. 6 is a graph similar to that of FIG. 5, but showing the relationship between viscosity and revolutions per minute for several fruit compositions.

FIG. 7 is a tabular comparison of the fruit particle content of a strawberry composition made by former processes with the fruit particle content of a similar composition made in accordance with the invention.

DESCRIPTION OF PREFERRED EMBODIMENTS

Figure 3:
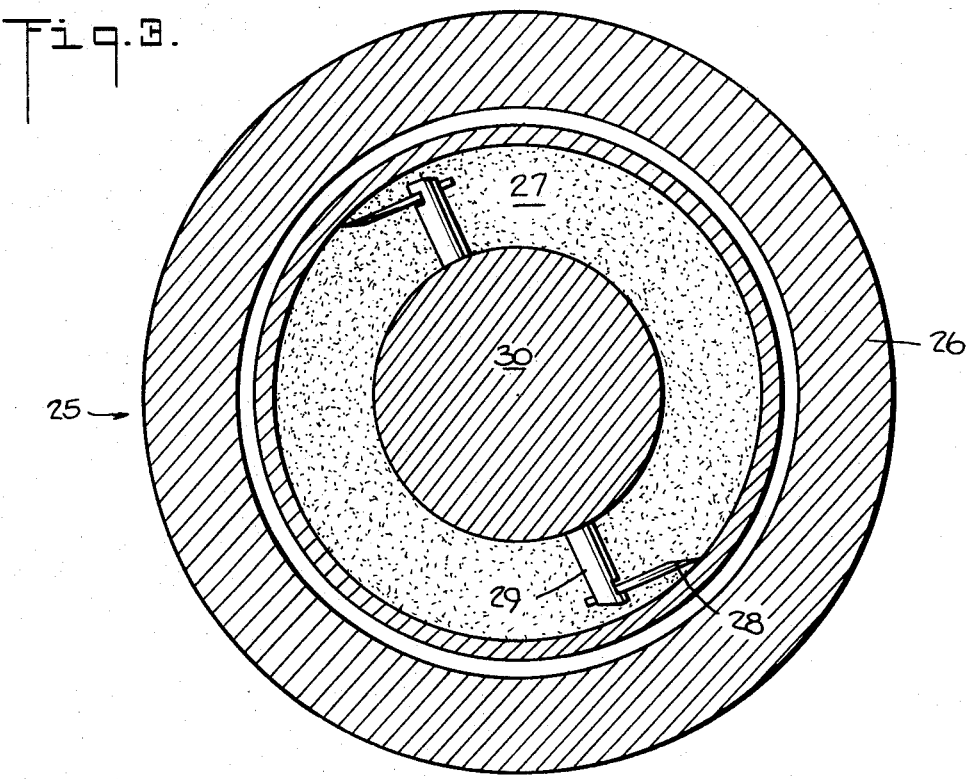
FIG. 3 is a schematic view, in cross section, of a scraped surface heat exchanger according to the invention.

Fruit compositions can be produced in large quantities by the use of the system schematically illustrated in FIG. 1. As shown, the fruit to be processed is either fed directly to a mixing vessel after any necessary cleaning and/or cutting, or if the fruit is initially frozen, it is passed through a heated screw conveyor for thawing before being fed to the mixing vessel. Fruit adjuvants are added to the fruit in the mixing vessel, and after thorough mixing the mixture is pumped to a heat exchanger for pasteurization. The hot mixture is held for a short period after passing through the heat exchanger and is then pumped through a second heat exchanger for cooling. After cooling, the fruit composition is passed to a filling station for filling into containers under aseptic conditions. The various steps of the process of the invention will be described in conjunction with a description of the apparatus for each process step.

Many fruits to be processed are initially taken from storage in a frozen state at temperatures between −25° to −10°C. In order to avoid lengthy periods for thawing such fruits, the invention utilizes a heated screw conveyor, preferably capable of heating frozen fruits from the temperature range given above to a temperature of about +15° to 20°C, in a period of 10 minutes or less. A screw conveyor adapted to such quick thawing of large quantities of fruit is shown in detail in FIG. 2 of the drawing.

Heated screw conveyors have been used in the past for such processes as cooking and blanching of food, and it has now been found that a heated screw conveyor can also be used for rapid thawing of frozen fruit, without substantial damage to the fruit.

As shown in FIG. 1 the screw conveyor 10 is generally in the form of an elongated chamber having a mantle 11 which may be heated by the flow of a heating fluid through passages in the mantle. An inlet 12 for frozen fruits to be thawed is provided at one end of the chamber, and an outlet 13 for thawed fruit is provided at the opposite end of the chamber. A screw 14 is mounted longitudinally within the chamber and driven by a motor 15 for rotational motion to advance the fruit helically through the chamber from inlet to outlet.

Figure 8:
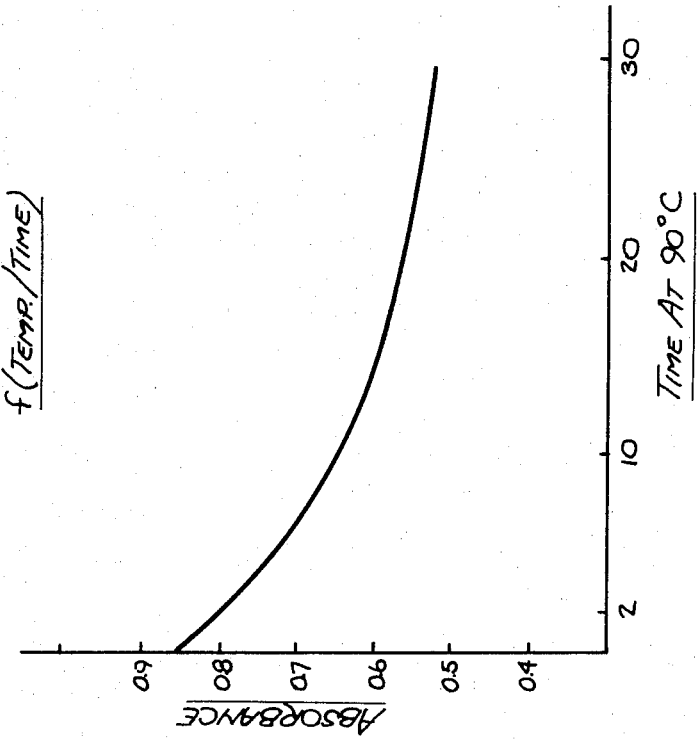
FIG. 8 is a graph illustrating the degradation of red vegetable color with time at a temperature of 90°C as determined by spectrophotometry (solutions heated at 90°C for various periods of time then cooled and measured).

Preferably two screws, 14a and 14b are mounted in opposed positions for rotation together as shown in FIG. 2 to advance the fruit along a path resembling a "figure 8" in cross-section. The use of two screws also prevents clogging of the machine.

The heat from a heated mantle is transferred to the fruit, but for most effective operation it has been found that hollow screws with internal passages 16 for the flow of a heating medium therethrough provide a much higher rate of heat transfer to the fruit. For example, if a double screw conveyor with two hollow heated screws 14a and 14b is used as shown in FIG. 2, the combined heated surface area of the screws will be several times as great as the area of the inner surface of the mantle. Further, the fact that the screws 14a and 14b are in motion makes transfer of heat from the screw surfaces to the fruit more efficient than heat transfer from the mantle.

Hot water at a temperature range of from about 75° to 96°C can be used as an effective medium for heating the screws and/or the mantle of the screw conveyor.

In order to thaw fruits entering at −25° to −10°C to a temperature of +15 to +20°C in a period of about 5 to 10 minutes, a high heat transfer coefficient is necessary. To heat 2,000 kg of fruit per hour a heating capacity of about 210,000 to 220,000 $k$ cal/hour is required. Tests made on a pilot conveyor having double screws demonstrated an average heat transfer coefficient of $k = 400$ kcal/m$^2$hr.°C.

It is currently contemplated that for the thawing of 2000 kg/hr of frozen fruit a double screw conveyor with two hollow screws about 12 feet long spaced 1 foot apart can be effectively used. The screws can have a diamter of about 16 inches and a pitch of about 6 or 7 inches. Screws so dimensioned have effective surface areas of about 127 square feet. In operation the screws may be run at speeds up to about 20 RPM. Rotation at about 5 RPM can be considered an average working speed.

Fruit can be fed into the screw conveyor at 12 by hand or by suitable mechanized equipment. At the outlet end 13 of the screw conveyor a paddle arrangement not shown in the drawing can be provided for removal of thawed fruit from the conveyor. Such an arrangement provides for storage of some thawed fruit before passage of the fruit to the mixing vessel.

A currently preferred embodiment of mixing apparatus for mixing fruit with other ingredients of the fruit composition is schematically illustrated in FIG. 1. As shown, the mixing apparatus comprises a stirrer 20 mounted to stir the contents of a heated vessel in the form of a kettle 21.

The kettle is suitably formed with a double wall for heating by the passage of steam between inner and outer kettle walls. Heated water could, of course, be used instead of steam. The kettle can have a volume of about 1000 liters for mixing large quantities of ingredients.

It will be clear that at this stage the process of the invention departs from its otherwise continuous operation, since mixing is done in batches. The batchwise mixing permits exact control of the proportions of ingredients processed, but does not result in any great slow-down of processing.

The thawed fruit from the screw conveyor (or fruit which did not need to be thawed), is fed into the kettles for thorough mixing with other ingredients such as sugar, thickening agents, flavoring substances, coloring substances and preservatives. Sugar may be added pneumatically, and other ingredients are normally added in powdered or liquid form. It is necessary not only to thoroughly mix the ingredients, but also to dissolve the sugar, if any sugar has been added. Heating is advantageous in the dissolving of sugar.

The mixtures which can be processed according to the invention vary widely, as shown by the "recipes" of the following examples, which are only illustrative of a large number of possible compositions.

EXAMPLE I

A bilberry composition produced according to the invention includes a small amount of chemical preservatives. The mixture is pasteurized at 90°C.

| | |
|---|---|
| Bilberries | 480. kg |
| Sugar | 636. kg |
| Water | 70. kg |
| Citric acid | 3.360 kg |
| Locust bean gum | 4.500 kg |
| Potassium sorbate 1:1 | 1.800 kg |
| Sodium benzoate 30% | 1.800 kg |
| | 1,197.460 kg |

EXAMPLE II

Various different fruits can be mixed together to produce a fruit cocktail in which the original fruits retain their individual characteristics. The following ingredients can be pasteurized safely at 80°C instead of the usual 90°C according to the invention.

| | |
|---|---|
| Pineapple, crushed | 345. kg |
| Pineapple and orange flavor | .640 kg |
| Grapefruit segments | 372.500 kg |
| Orange segments | 40. kg |

-Continued

| | | |
|---|---|---|
| Pear cubes | 125. | kg |
| Potassium sorbate 1:1 | 2. | kg |
| Locust bean gum | 3. | kg |
| Red beet color concentrate | .890 | kg |
| Commercial raspberry puree | 115. | kg |
| | 1,004.030 | kg |

EXAMPLE III

The following ingredients, mixed together and pasteurized according to the invention at 90°C produce a peach melba composition.

| | | |
|---|---|---|
| Peach, chopped | 590. | kg |
| Raspberries | 50. | kg |
| Water | 40. | kg |
| Sugar | 565. | kg |
| Locust bean gum | 2. | kg |
| Citric acid | 2. | kg |
| Flavors | 3.850 | kg |
| Red beet color | 2.800 | kg |
| Potassium sorbate 1:1 | 2. | kg |
| Sodium benzoate 30% | 2. | kg |
| | 1,259.650 | kg |

EXAMPLE IV

Pasteurization at 90°C of the following ingredients mixed according to the invention produces an attractive raspberry composition.

| | | |
|---|---|---|
| Raspberries | 384. | kg |
| Sugar | 465. | kg |
| Water | 256.800 | kg |
| Sugar syrup 66% | 48. | kg |
| Raspberry flavor | 2.508 | kg |
| Potassium sorbate 1:1 | 3.450 | kg |
| Red beet color | 14.400 | kg |
| Locust bean gum | 8.500 | kg |
| | 1,182.658 | kg |

EXAMPLE V

A strawberry composition can be produced by mixing together the following ingredients and pasteurizing according to the invention at 90°C. Formula corresponding to viscosity measurements.

| | | |
|---|---|---|
| Strawberry | 750. | kg |
| Sugar | 250. | kg |
| Water | 30. | kg |
| Locust bean gum | 7. | kg |
| Red beet color | 8.500 | kg |
| Sorbate | 3. | kg |
| Flavor | 3.500 | kg |
| | 1,052. | kg |

EXAMPLE VI

To produce a stawberry composition according to the invention without adding chemical preservatives, the following ingredients are mixed and pasteurized at 90°C.

| | | |
|---|---|---|
| Strawberries | 400. | kg |
| Sugar | 500. | kg |

-Continued

| | | |
|---|---|---|
| Water | 150. | kg |
| Citric acid | 2. | kg |
| Locust bean gum | 4.800 | kg |
| Strawberry flavor | 2.720 | kg |
| | 1,060.020 | kg |

EXAMPLE VII

As another example of a mixture of a number of different fruits pasteurized according to the invention at 80°C, a fruit cocktail can be produced from the following ingredients.

| | | |
|---|---|---|
| Pineapple, crushed | 320. | kg |
| Apricots cut into fine pieces | 320. | kg |
| Orange segments | 160. | kg |
| Water | 25. | kg |
| Prunes, natural, cut | 160. | kg |
| Lemon juice concentrate | 4.200 | kg |
| Orange juice concentrate | 4.200 | kg |
| Sugar | 25. | kg |
| Locust bean gum | 2.500 | kg |
| Citric acid | 0.500 | kg |
| Fruit cocktail flavor | 3.245 | kg |
| Red beet color | 0.800 | kg |
| | 1,025.445 | kg |

As mentioned above, the kettle is adapted to be heated. At the mixing stage, the fruit and other ingredients are heated from about 15°C to about 40°C. The necessary energy for such heating is about 20,000 to 30,000 k cal per 1000 kg of ingredients.

In order to provide the energy necessary for heating in a hollow walled kettle 21 of the type described, steam at a temperature of about 120°C or hot water under pressure at a temperature in the range of 90°C to 120°C is circulated between the kettle walls.

A stirrer 20 mounted eccentrically with respect to the kettle axis and having an inclination of about 15° with respect to vertical can effectively be used for mixing. Such an angled, eccentric stirrer causes a vertical movement of the ingredients during mixing, assuring a homogeneous mixture. When such an arrangement is used, baffles in the kettle are not needed, but some other arrangement employing baffles could be used.

Normally the mixture is heated and stirred in the kettle for about 20 to 30 minutes before passing the homogeneous mixture thus produced on to further heating for pasteurization.

The fruit and other ingredients of the mixture must be treated to destroy any viable micro-organisms, but the sterilization treatment must be sufficiently gentle to avoid destruction of fruit particles which impart true fruit characteristics to the composition. Color, texture and other fruit qualities must also be retained. Thermal pasteurization is believed to be the only feasible way of killing the micro-organisms in the fruit mixture, but because of the nature of the product desired and the requirement that large quantities of fruit composition must be economically produced, conventional methods of thermal pasteurization are not suitable.

In accordance with the present invention, pasteurization is accomplished in a period of 10 minutes or less by means of a heat exchanger of the scraped-surface type, through which the mixture from the mixing kettle is gently pumped. A scraped surface heat exchanger 25 in accordance with the invention is shown schematically in FIG. 3.

As clearly shown the heat exchanger 25 of the invention consists of a hollow cylindrical shell 26 surrounding an annular passage 27 for the mixture. The heat exchange medium is circulated through the outer shell 26 and heat is transferred between the medium and the mixture passing through the annular space 27. The inner surface 26a of the shell 26 is constantly scraped by rotating blades 28 extending outward on arms 29 from a central rotor 30.

The mixture to be passed through the annular space within the heat exchanger is pumped into the heat exchanger, preferably by means of a capsule pump 24. The foregoing description applies to both a first heat exchanger 25 for pasteurizing the mixture and to a second heat exchanger 35 for cooling after pasteurization. If desired a battery of relatively small heat exchangers can be employed in place of either the pasteurizing heat exchanger 25 or the cooling heat exchanger 35. Such smaller heat exchangers should be scraped surface heat exchangers differing chiefly in size from the apparatus 25 described.

It should be recognized that the qualities required in a fruit composition that retains the characteristics of its natural fruit constituents place strict requirements on the processing apparatus and method of production. Before further describing heat exchangers suitable for heating and cooling of fruit mixtures according to the invention, the conditions affecting quality should be considered.

Figure 9:
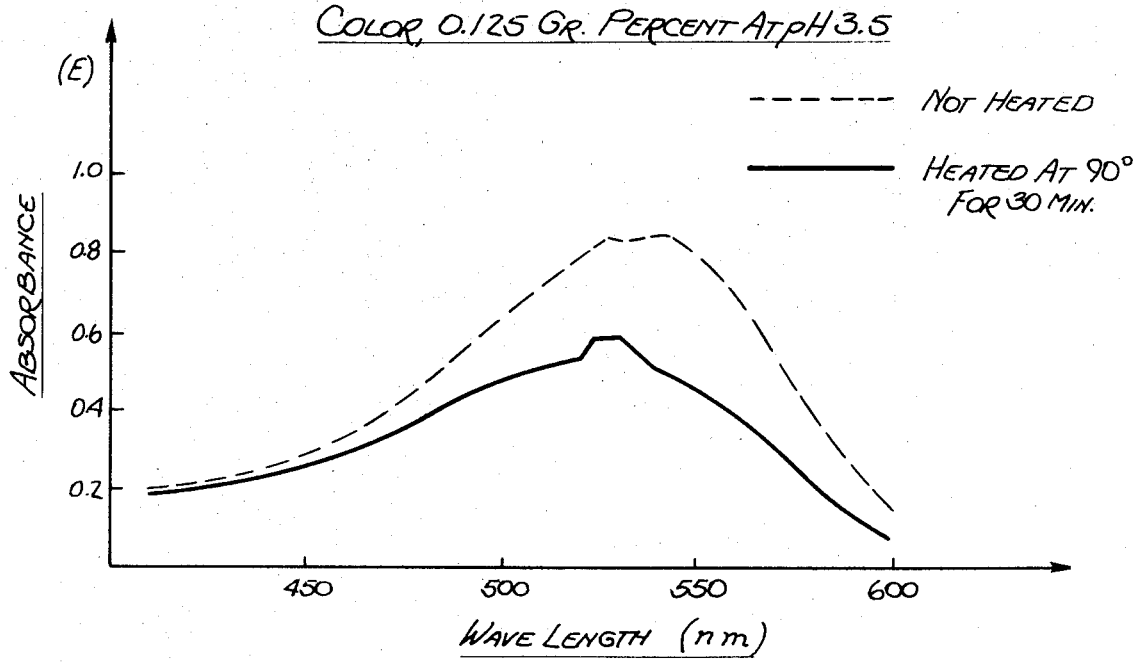
FIG. 9 is a graph comparing the absorption spectrum of unheated red beet coloring with the absorption spectrum of the same coloring material after a period of 30 minutes at 90°C.
Figure 4:
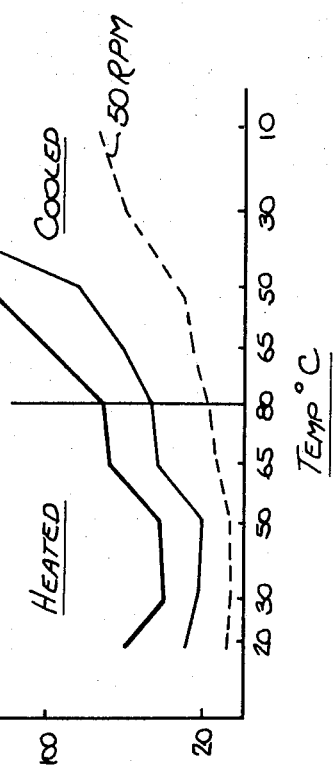
FIG. 4 is a graph showing the results of experimental measurements of the relationship between the temperature and viscosity of a strawberry composition through a heating and cooling cycle.

The graphs of FIGS. 4 to 9 illustrate the dependence of several important factors affecting product quality upon process parameters. Thus, FIGS. 4–6 show the relationships of viscosity of fruit mixtures processed with temperature and rate of agitation. FIGS. 8 and 9 relate to color degradation under the influence of heat.

The method and apparatus of the present invention represent a balance of these and other quality conditions against the necessity for proper pasteurization and the requirements of economical commercial scale production.

The dependence of viscosity of fruit mixtures for compositions according to the invention upon both temperature and mechanical stress (agitation), sets limits upon the processing apparatus. If the viscosity becomes too high in the course of treatment of the fruit mixture, greater mechanical force is needed to process the mixture, and the stress induced will damage fruit particles. Also, since a substantially continuous process is desirable, the flow characteristics of the fruit mixture are important.

It has been found that as the temperature of a fruit mixture according to the invention is raised, the viscosity generally increases somewhat. If thickeners such as gums are present in the mixture, the increase in viscosity accompanying an increase in temperature is quite noticeable. A much greater increase in viscosity occurs, however, when a fruit mixture is cooled after heating. FIG. 4, in which temperature in degrees Centigrade appears as the abscissa and viscosity in poises as the ordinate, shows the results of tests made on the strawberry mixture according to Example V with a Brookfield viscosimeter. In these tests the mechanical resistance to the rotation of a disc turning in the strawberry mixture was recorded as the mixture was heated from 20°C to 80°C and then cooled to 10°C. It will be noted that the tendency of the viscosity to increase during cooling can be partially overcome by more rapid agitation, but it should be borne in mind that increasing the rate of agitation is effected at the expense of disintegration of desirable fruit particles in the mixture.

The results shown in FIG. 4 demonstrate the importance of rapid cooling after pasteurization to avoid the use of vigorous agitation which would destroy the structure of fruit particles. Some agitation is necessary, however, to keep the fruit mixture in a flowable condition. FIG. 5 uses the data from FIG. 4 to show the relationship between viscosity and rate of agitation of the strawberry mixture at several different constant temperatures. The rate of rotation of a Brookfield viscosimeter is shown in RPM along the abscissa and the viscosity is shown along the ordinate in FIG. 5. The high viscosity, especially at low temperatures, of an unstirred mixture, shows the need for some mechanical agitation. The scraped surface heat exchanger, with its gentle folding action, is capable of providing the necessary amount of mechanical agitation during both the heating and cooling operations. Since viscosity increases rapidly when agitation stops, a continuous process is highly desirable to avoid the use of large forces on a highly viscous mixture, since such forces would damage fruit particles which should be retained.

FIG. 6 is similar to FIG. 5 in that viscosity is shown as a function of the rate of agitation as measured with a Brookfield viscosimeter. FIG. 6 shows the characteristic curves of a number of different fruit mixtures according to the invention. Besides the strawberry mixture discussed in connection with FIGS. 4 and 5, tests were made with coupe helene, banana and peach mixtures. FIG. 6 is intended to illustrate the wide variation is viscosity of the fruit mixtures to be processed according to the invention. Despite this wide variation, the apparatus and process of the invention provide good results.

Another important factor affecting quality is the heat sensitivity of fruit color substances. Since thermal pasteurization is employed in the process of the invention the effect of the heat employed on the color of the product must be considered with a view to minimizing color degradation due to heat.

FIG. 8 shows the degradation of red beet color under the influence of heat over a period of 30 minutes. Strawberry and raspberry compositions according to the invention are attractive additions to milk products, but the colors of the berries are rather weak when the compositions are added to milk products, so red beet coloring is often added in amounts of 1 to 2 percent of the total weight of the composition. The temperature sensitivity of red beet color is thus important, not only as it exemplifies the loss of natural vegetable color during heating, but also because red beet color can actually be used in the production of fruit compositions according to the invention.

The color measurements of FIGS. 8 and 9 were made by using a Beckman DB spectrophotometer for analyses of an 1100 ml solution of 0.125 grams of concentrated red beet color from beet juice in water at a pH of 3.5 with 125 parts per million ascorbic acid added to imitate the acid content of natural fruit.

FIG. 8 shows the influence of heat treatment measuring the absorption of light at a wavelength of 538 nanometers at room temperature. The samples were exposed to heat at 90°C for various time intervals and cooled back to room temperature. As clearly shown the absorption decreased substantially with time at which the solution had remained at 90°C.

FIG. 9 shows the absorption spectrum of red beet color in solution at room temperature as in FIG. 8. Unheated beet color solution absorbed light more effectively, especially at wave-lengths between 400 and 550 nm than did the same color solution after 30 minutes of heating at 90°C and cooling back to room temperature. Visual comparison showed marked color difference, the heated beet color solution having turned brownish.

The effect of color degradation illustrated by FIGS. 8 and 9 makes it important that no extended heat treatment be used for pasteurization if natural fruit color is to be retained by the pasteurized product. In accordance with the invention, heating for pasteurization is accomplished in less than 10 minutes, and preferably in 4 to 8 minutes.

Reverting now to FIG. 3, the details of construction of a scraped surface heat exchanger capable of fulfilling the process requirements analyzed above can be set forth. It has been noted that to avoid color degradation, heating for pasteurization of the fruit mixture must be rapid. The heating cycle including heating up to, and holding the mixture at, 80° to 90°C must be accomplished in 10 minutes or less, and preferably in 4 to 8 minutes. This requires a large heat transfer coefficient. By passage of the mixture through a narrow annular passage, while rotating blades gently fold the mixture, high rates of heat exchange can be achieved with a scraped surface heat exchanger. The viscosity of the mixture must also be taken into consideration, as well as the fact that fruit particles must pass through the annular passage undamaged.

For these reasons, the annular passage should have a width, measured from rotor to the inner cylindrical shell surface, of about 1.8 to 4.0 cm.

The size of the heat exchanger is important, since the greater the area of the heat transfer surface, the less necessity there is for folding the mixture by means of the rotating blades to enhance heat transfer to the fruit and fruit adjuvants of the mixture. If the heat transfer surface area of the heat exchanger is larger than 1.5 square meters, i.e., a tube diameter of 50 cm or more, the rotor can be rotated at a rate of about 45 RPM, but for smaller heat exchangers, having heat transfer surfaces less than 1.5 square meters, the rotation rate must be higher--up to about 400 RPM. Rotation substantially faster than 400 RPM is to be avoided because of the resulting disintegration of fruit particles, so a heat exchanger having a suitably large heat exchanger surface must be used.

The mixture is pumped through the heat exchanger by means of a capsule pump. The system is closed at the heat exchanger and the operating pressure may suitably be greater or less than atmospheric pressure. Good results are obtained at operating pressures of about 4 to 7 kg/cm² or at low pressures of about 0.5 kg/cm² in the heat exchanger.

To heat a fruit mixture according to the invention from 40°C to about 80–90°C for pasteurization, a heat transfer of about 50,000 to 60,000 $k$ cal per 1000 kg of mixture is needed, and this can be obtained in accordance with the present invention by using saturated steam at 120–125°C as the heating medium for the scraped surface heat exchanger. In a test heat exchanger of the kind just described and operated within the limits set forth above, the heat transfer coefficient was found to be $k$ = 800 to 1000 k cal/m²hr°C.

In order to achieve thermal pasteurization rapidly without long exposure of the mixture to heat, which would destroy fruit color, it has been found effective to pass the mixture rapidly through the heat exchanger and then hold the heat mixture for a period of about 3 minutes at its elevated pasteurization temperature, either in an unheated area of the heat exchanger itself, or in a separate vessel, shown at 30 in FIG. 1. By using a suitable scraped surface heat exchanger having a high heat transfer coefficient as set forth above, the total period spent passing through the heat exchanger and in residence at the elevated temperature of 80°–90°C can be about 4 – 6 minutes. Such a short heat treatment time results in good retention of natural food color and texture.

The compositions according to the invention need not be entirely sterile, and the most heat resistance spores of some bacteria are usually not killed by pasteurization according to the invention. However, the acidic milieu of some milk products prevents bacterial growth. Other milk products such as ice cream are kept in low temperatures, and some milk products such as desserts are pasteurized again after a fruit composition has been added.

The following table shows the results of bacteriological tests carried out in a pilot plant heat exchanger on cherries infected with baker's yeast to determine safe time and temperature conditions for pasteurization.

| Pasteurization temperature °C | Hold time minutes | cherries germs/ml |
|---|---|---|
| 98–99° | 1 | 1,000 |
| do. | 3 | 0 |
| do. | 6 | 300 |
| do. | 10 | 0 |
| 90° | 0 | 200,000 |
| do. | 2 | 100 |
| do. | 3 | 1,000 |
| do. | 4 | 1,000 |
| do. | 5 | 1,000 |
| do. | 6 | 1,000 |
| 80° | 1 | 5,000 |
| do. | 3 | 500,000 |
| do. | 6 | 880,000 |

It is not necessary or desirable to use higher temperatures than, say, 100°C, since no substantial benefit in sterility is obtained when weighed against the loss of fruit color resulting from such high temperatures. Since a germ count of 1000/ml is acceptable, 3 minutes hold time at 90°C is safe for cherries. As noted in the Examples, 80°C is a safe pasteurizing temperature for some compositions.

Secondary reinfection must be avoided, especially for unpreserved products having a sugar content below 65° on the Brix scale. The use of a closed system, with aseptic filling, is necessary. Some such products may be filled into containers while still hot, at the pasteurization temperature, without the subsequent rapid cooling step now to be described.

The second heat exchanger 35 may be substantially the same as the heat exchanger just described, except that the heat exchange medium is cold, to lower the temperature rapidly from about 90°C to about 20°C. About 65,000 to 70,000 kcal/1000gm have to be removed from the hot mixture. A heat transfer coefficient of about $k = 800$ kcal/hr.m$^2$°C is contemplated. As a coolant, ammonia or freon under direct evaporation, cold water at 3°C, or precooled ethylene glycol, or a combination of two of these liquids can be used. The passage of the mixture through the second heat exchanger should take less than 10 minutes, and preferably only about 2 to 5 minutes, again to prevent color loss, by cooling the mixture quickly down to a temperature suitable for filling the composition into containers. If necessary, another capsule pump 34 is used to pump the mixture through the second heat exchanger.

After cooling the composition can be filled under aseptic conditions by piping the composition directly from the cooling heat exchanger to an automated aseptic filling line for filling directly into presterilized containers. Alternatively the composition can pass, via buffer tanks, to an aseptic filling line for filling into large plastic bags.

It can readily be seen that the method and apparatus according to the invention can be utilized to produce a great variety of fruit compositions suitable for addition to milk products. Prior art processes were largely non-automated and required at least twice the man hours per ton of fruit composition in production. The present invention has the advantages of low cost as well as superior product quality.

Fruit compositions produced according to the invention contain fruit particles having diameters between 1 and 2 centimeters. Such particles must be retained through processing if the composition is to have the texture and appearance characteristic of natural fruit. Ordinary tube heat exchangers are not suitable for use in the process of the invention since they damage such fairly large fruit particles. Prior art batch processing is also unsatisfactory. FIG. 7 shows the difference between fruit compositions made according to the invention and compositions based on the same fruit (strawberries) made by a method formerly used.

The former method of pasteurization was a batch process in which fruits were mixed with other ingredients in kettles and vigorously stirred while heating to 80°-85°C. The vigorous stirring was necessary to obtain reasonable heat transfer to the fruit. FIG. 7 shows four examples of strawberry mixtures made according to the process of the invention compared with mixtures of the same ingredients made by the former method. The first column in each example represents the quantity of berry particles in the mixture before pasteurization. The second column in each example represents the fruit particle content of the mixture after pasteurization according to the present invention, and the third column shows the particle content after batch pasteurization by the old procedure. The data shown in FIG. 7 were obtained by separating fruit particles larger than 5 mm from the mixture with a sieve by diluting 100 grams of mixture with 400 grams of water, pouring the diluted mixture into a sieve having a 5 mm mesh, shaking the sieve under water and allowing particles to drop from the sieve for 5 minutes. The percentages shown in FIG. 7 represent the wet weight of particles remaining in the sieve.

The four examples of FIG. 7 represent mixtures with different amounts of sugar from no sugar to 57 percent sugar. It will readily be seen that pasteurization according to the invention causes only a small loss of fruit particles while pasteurization by the old process destroys most of the fruit particles.

The preparation of one particular fruit composition, made from strawberries in accordance with the recipe given above as Example V, will be adequate to demonstrate the use of the process and apparatus of the invention on a commercial scale.

Example VII

Amounts of 200 kilograms each of frozen whole strawberries are taken from storage in a frozen state at about −10°C. The strawberries are thawed by continuously feeding the strawberries into and through a screw conveyor of the heated double screw type already described in connection with FIG. 2 of the drawing. Hot water at about 90°C is used as the heating medium, and the screws of the conveyor are rotated to pass the strawberries through the conveyor in continuous flow with a residence time of about 5-15 minutes in the conveyor. The thawed strawberries emerge at a temperature of about 20°C and are fed directly into a mixing kettle for mixture with the sugar and other ingredients stated in Example V. The sugar is preferably added pneumatically.

The kettle is heated by the passage of steam at a temperature of about 120°C between double walls of the kettle. The ingredients in the kettle are constantly stirred for a period of about 20 minutes to produce a homogeneous mixture at a temperature of about 40°C.

The mixture is then removed from the kettle and passed through a scraped surface heat exchanger in a continuous flow for pasteurization. The preferred type of heat exchanger has been described above with reference to FIG. 3. Saturated steam at about 120°C is used as the heating medium, and the mixture passes continuously through the heat exchanger with a dwell time therein of only 2 minutes, which is sufficient to heat the mixture to 90°C. The mixture is held at 90°C for a period of 3 minutes to insure pasteurization. The pasteurized mixture then passes in a continuous flow in a closed system to a second scraped surface heat exchanger for cooling to about 20°C. The cooling cycle takes about 4 minutes.

After cooling, and without exposure to the environment, the fruit composition is passed to an aseptic filling machine where the composition is filled into containers.

The composition contains a substantial amount of strawberry particles larger than 1 cm in diameter, and when added to yogurt or some other milk product, retains the color, the characteristic texture, and other qualities of fresh strawberries.

The process and apparatus of the invention will suggest numerous modifications, substitutions and applications to those familiar with food processing. Such changes and applications are within the spirit and scope of the invention.

What is claimed is:

1. A process for preparing fruit compositions suitable for addition to milk products while retaining the characteristic texture, structure, taste and color of fruit in the compositions which comprises: (a) mixing fruit with one or more fruit adjuvants while heating said mixture to form a substantially homogenous mixture, (b) passing said mixture through a scraped surface heat exchanger while turning the mixture over to rapidly thermally pasteurize the mixture without substantial degradation of the fruit composition or significant disintegration of fruit particles, (c) rapidly cooling said mixture to room or ambient temperature by passing said mixture through a second scraped surface heat exchanger, and (d) filling said mixture into a container under aseptic conditions.

2. The process of claim 1 wherein said thermal pasteurizing is conducted at a temperature of from 80°–100°C for a period of time of less than 10 minutes.

3. The process of claim 2 wherein the fruit is initially in a frozen state and including a step of heating the fruit to a temperature of about 15°C to 20°C to thaw the frozen fruit before said mixing.

4. The process of claim 3 wherein said heating to thaw the fruit is accomplished by helically conveying the fruit through a heated passage.

5. The process of claim 1 wherein all of the steps subsequent to said mixing with other ingredients are performed continuously within a closed system.

6. A process for the preparation of fruit compositions suitable for addition to milk products from frozen fruits comprising:
 a. thawing frozen fruits by mechanically conveying the fruit through an enclosed passage by means of at least one heated screw for heating the fruit to a temperature of about 15°C to 20°C;
 b. mixing the thawed fruit from step (a) with fruit adjuvants and heating said fruit and fruit adjuvants during said mixing to a temperature of about 30°C to 50°C to form a substantially homogeneous mixture;
 c. pumping the mixture from step (b) through a scraped surface heat exchanger while heating the mixture to a temperature of about 80°C to 90°C to pasteurize the mixture without degrading the mixture or disintegrating fruit particles in the mixture;
 d. pumping the pasteurized mixture from step (c) through a second scraped surface heat exchanger for cooling the mixture to a temperature of about 15°C to 25°C to produce the fruit composition; and
 e. filling said fruit composition into containers under aseptic conditions.

7. The process of claim 6 wherein the fruit adjuvants mixed with the fruit include sugar.

8. The process of claim 6 wherein the fruit adjuvants mixed with the fruit include thickening agents.

9. The process of claim 6 wherein the fruit adjuvants mixed with the fruit include coloring substances.

10. The process of claim 6 wherein the fruit adjuvants mixed with the fruit include flavoring substances.

11. The process of claim 6 wherein the fruit adjuvants added to said fruit include chemical preservatives.

* * * * *